United States Patent
Vassilieva et al.

(10) Patent No.: US 7,609,969 B2
(45) Date of Patent: Oct. 27, 2009

(54) METHOD AND SYSTEM FOR COMPENSATING FOR OPTICAL DISPERSION IN AN OPTICAL SIGNAL

(75) Inventors: Olga I. Vassilieva, Plano, TX (US); Susumu Kinoshita, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 438 days.

(21) Appl. No.: 11/311,717

(22) Filed: Dec. 19, 2005

(65) Prior Publication Data

US 2007/0140700 A1    Jun. 21, 2007

(51) Int. Cl.
    *H04J 14/02*  (2006.01)
(52) U.S. Cl. .................................................... 398/81
(58) Field of Classification Search ............... 398/81, 398/147, 148, 158, 159
See application file for complete search history.

(56) References Cited

U.S. PATENT DOCUMENTS

| | | | |
|---|---|---|---|
| 6,771,854 B2 * | 8/2004 | Matsuoka et al. | 398/147 |
| 6,823,108 B1 * | 11/2004 | Leisching | 385/27 |
| 7,149,433 B2 * | 12/2006 | Grubb et al. | 398/175 |
| 7,277,648 B2 * | 10/2007 | Lanne et al. | 398/198 |
| 2001/0046077 A1 * | 11/2001 | Akiyama et al. | 359/161 |
| 2003/0185568 A1 * | 10/2003 | Ooi et al. | 398/81 |
| 2004/0184814 A1 * | 9/2004 | Ooi et al. | 398/147 |
| 2006/0045532 A1 * | 3/2006 | Yano | 398/147 |
| 2006/0067704 A1 * | 3/2006 | Fishman et al. | 398/161 |
| 2007/0140700 A1 | 6/2007 | Vassilieva et al. | |

OTHER PUBLICATIONS

Furst et al., "Analysis of Crosstalk in Mixed 43 Gb/s RZ-DQPSK and 10.7 Gb/s DWDM Systems at 50 GHz Channel Spacing," 3 pages, 2007 Optical Society of America, 2007.
Gnauck et al., "Spectrally Efficient (0.8 b/s/Hz) 1-Tb/s (25×42.7 Gb/s) RZ-DQPSK Transmission Over 28 100-km SSMF Spans with 7 Optical Add/Drops," 2 pages.
Charlet et al., "Nonlinear Interactions Between 10Gb/s NRZ Channels and 40Gb/s Channels with RZ-DQPSK or PSBT Format, over Low-Dispersion Fiber," 2 pages.
Sano et al., "14-Tb/s (140×111-Gb/s [D./WDM) CSRZ-DQPSK Transmission over 160 km Using 7-THz Bandwidth Extended L-band EDFAs," 2 pages.

(Continued)

*Primary Examiner*—Shi K Li
(74) *Attorney, Agent, or Firm*—Baker Botts L.L.P.

(57) ABSTRACT

A method for compensating for optical dispersion in an optical signal includes receiving an optical signal comprising a plurality of channels. The information being communicated in a first set of channels is modulated using a first modulation technique, and the information being communicated in a second set of channels is modulated using a second modulation technique. The method also includes compensating for optical dispersion in the optical signal such that dispersion compensation for the first set of channels is complete and such that dispersion compensation for the second set of channels is incomplete. In addition, the method includes splitting the optical signal into a first copy and a second copy, terminating the second set of channels in the first copy, performing additional dispersion compensation on the second copy such that dispersion compensation for the second set of channels is complete, and terminating the first set of channels in the second copy.

12 Claims, 4 Drawing Sheets

OTHER PUBLICATIONS

Lefrancois et al., "Cross Comparison of the Nonlinear Impairments Caused by 10Gbit/s Neighboring Channels on a 40Gbit/s Channel Modulated with Various Formats, and Over Various Fiber Types," 2006 Optical Society, 3 pages, 2006.

U.S. Appl. No. 12/047,584, entitled "Method and System for Compensating for Optical Dispersion in an Optical Signal," filed Mar. 13, 2008, pp. 1-22, 3 pages of drawings, Mar. 13, 2008.

* cited by examiner

METHOD AND SYSTEM FOR COMPENSATING FOR OPTICAL DISPERSION IN AN OPTICAL SIGNAL

TECHNICAL FIELD OF THE INVENTION

The present invention relates generally to optical networks and, more particularly, to a method and system for compensating for optical dispersion in an optical signal.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths experiences optical dispersion, a sometimes undesirable phenomenon that causes the separation of an optical wave into spectral components with different frequencies. Optical dispersion occurs because the differing wavelengths propagate at differing speeds. The separation of an optical wave into its respective channels due to optical dispersion requires optical dispersion compensation for the particular optical signal.

SUMMARY

In accordance with a particular embodiment of the present invention, a method for compensating for optical dispersion in an optical signal includes receiving an optical signal comprising a plurality of channels. The information being communicated in a first set of one or more of the channels is modulated using a first modulation technique, and the information being communicated in a second set of one or more of the channels is modulated using a second modulation technique. The method also includes compensating for optical dispersion in the optical signal such that dispersion compensation for the first set of channels is complete and such that dispersion compensation for the second set of channels is incomplete. In addition, the method includes splitting the optical signal into at least a first copy of the optical signal and a second copy of the optical signal, terminating the second set of channels in the first copy, performing additional dispersion compensation on the second copy such that dispersion compensation for the second set of channels is complete, and terminating the first set of channels in the second copy.

In accordance with another embodiment of the present invention, a method for dispersion compensation of an optical signal includes receiving an optical signal comprising a plurality of channels. The information being communicated in a first set of one or more of the channels is modulated using a first modulation technique, and the information being communicated in a second set of one or more of the channels is modulated using a second modulation technique. The method also includes compensating for optical dispersion in the optical signal such that dispersion compensation for the first set of channels is complete and such that dispersion compensation for the second set of channels is incomplete. In addition, the method includes demultiplexing the optical signal into the optical signal's constituent channels and performing additional dispersion compensation on the second set of channels such that dispersion compensation for the second set of channels is complete. Additionally, the method includes multiplexing the first and second sets of channels to form a compensated optical signal.

In accordance with yet another embodiment of the present invention, a method for dispersion compensation of an optical signal includes receiving an optical signal comprising a plurality of channels. The information being communicated in a first set of one or more of the channels is modulated using a first modulation technique, and the information being communicated in a second set of one or more of the channels is modulated using a second modulation technique. In addition, the method includes uniformly overcompensating for optical dispersion in the optical signal across all of the channels of the optical signal.

Technical advantages of one or more embodiments of the present invention may include performing complete optical dispersion compensation on optical signals comprised of a plurality of channels carrying data modulated using different modulation techniques or different bit rates. For example, one or more embodiments of the present invention may perform complete optical dispersion compensation for a WDM signal comprised of ten-gigabit-per-second, non-return-to-zero channels and forty-gigabit-per-second, differential-phase-shift-keying or differential-quadrature-phase-shift-keying channels. Thus, the performance of both sets of channels will be optimal or near-optimal after complete optical dispersion compensation.

Technical advantages of one or more embodiments of the present invention may also include increasing signal performance across the network by performing optical dispersion overcompensation uniformly across all of the differently-modulated channels in a signal. Performing overcompensation across all channels may, optimally or near-optimally, reduce interchannel effects in a signal. Reducing interchannel effects may increase the performance of the signal.

Embodiments of the present invention may also allow for an economically efficient system and method for performing optical dispersion compensation on optical signals comprised of channels with different modulation formats. One or more of the embodiments of the present invention may include system components currently in use in optical networks or allow for economically efficient upgrades of or additions to currently used components.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
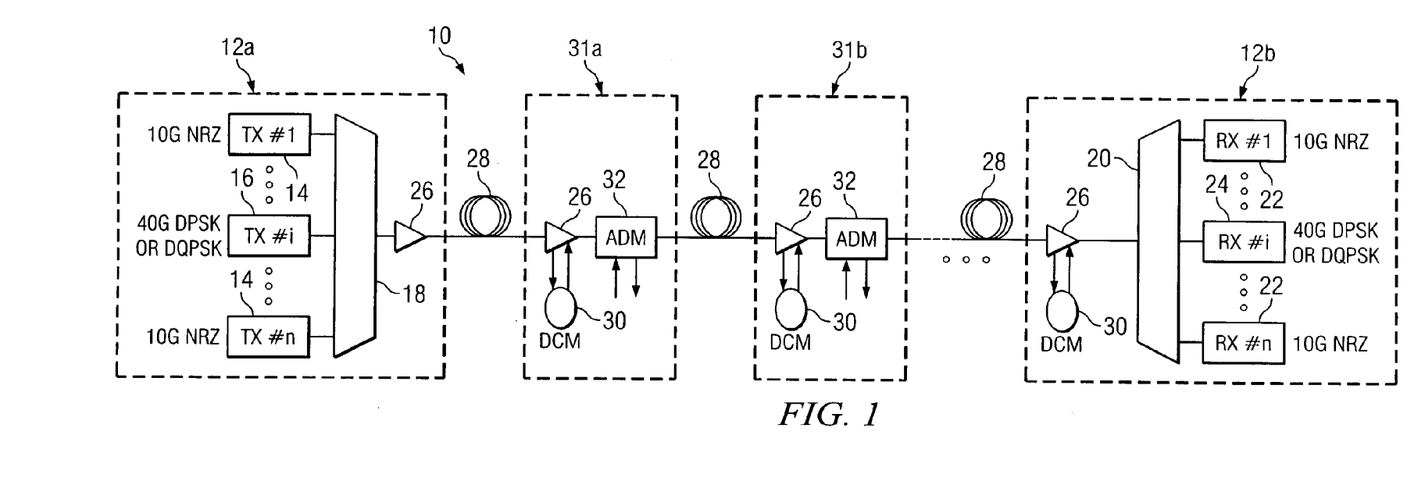
FIG. 1 is a block diagram illustrating one embodiment of an optical network carrying a signal comprising a plurality of sets of channels using at least two different modulation formats.

FIG. 1 illustrates an example optical network 10. The optical network 10 includes one or more optical fibers 28 operable to transport one or more optical signals communicated by components of the optical network 10. The components of optical network 10, coupled together by the optical fibers 28, include terminal nodes 12a and 12b and one or more optical add/drop multiplexers (OADM) 31 (for example, OADMs 31a and 31b). Although the optical network 10 is shown as a point-to-point optical network with terminal nodes, the optical network 10 may also be configured as a ring optical network, a mesh optical network, or any other suitable optical network or combination of optical networks. The optical network 10 may be used in a short-haul metropolitan network, a long-haul inter-city network, or any other suitable network or combination of networks.

Terminal node 12a includes transmitters 14 and 16, a multiplexer 18, and an amplifier 26. Transmitters 14 and 16 include any transmitter or other suitable device operable to transmit optical signals. Each transmitter 14 or 16 is operable to receive information and to modulate one or more wavelengths of light to encode the information on the wavelength. In optical networking, a wavelength of light is also referred to as a channel. Each transmitter 14 or 16 is also operable to transmit this optically encoded information on the associated wavelength. The multiplexer 18 includes any multiplexer or combination of multiplexers or other devices operable to combine different channels into one signal. Multiplexer 18 is operable to receive and combine the disparate channels transmitted by transmitters 14 and 16 into an optical signal for communication along fibers 28.

Amplifier 26 may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy is applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, the terminal node 12a in optical network 10 is operable to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten gigabits per second (GB/s) and modulate the information using, for example, a non-return-to-zero (NRZ) modulation technique. Signal transmission upgrades include, for example, transmitting information at forty GB/s using differential phase shift keying (DPSK) or differential quadrature phase shift keying (DQPSK) to modulate the optical signal. Since upgrading the entire optical network's transmitters would be cost-prohibitive for most optical network operators, many such operators have instead desired to upgrade their networks by incrementally replacing existing ten GB/s NRZ transmitters with forty GB/s DPSK or DQPSK transmitters (these types of transmitters being used only as examples).

One challenge faced by those wishing to implement the cost-efficient strategy of integrating upgraded transmitters with existing transmitters is the challenge of optical dispersion compensation. Even in existing WDM and DWDM networks, optical signals comprised of disparate wavelengths experience optical dispersion. Optical dispersion refers to the separation of an optical signal into its spectral components with different frequencies. Optical dispersion occurs because the differing wavelengths propagate at differing speeds. As optical signals travel across existing optical networks and experience optical dispersion, they may receive "complete" optical dispersion compensation to achieve optimal or near-optimal performance. As used herein, "complete" optical dispersion compensation refers to the optimum or near-optimum optical dispersion compensation for a particular modulation technique. Specially designed dispersion compensation fibers have been developed to compensate for dispersion in an optical signal comprised of channels modulated using the same modulation technique.

Systems that employ both upgraded transmitters and existing transmitters need to perform optical dispersion compensation on channels that use different modulation techniques. The challenge that arises is that complete optical dispersion compensation for channels using different modulation techniques may be different. For example, this is in fact the case with channels modulated using NRZ modulation and channels modulated using DPSK or DQPSK modulation, as illustrated in FIGS. 2A and 2B.

As discussed above, the graphs in FIGS. 2A and 2B illustrate the difference in optimum optical dispersion compensation for two different WDM optical signals, a ten GB/s NRZ signal and a forty GB/s DPSK or DQPSK signal. The vertical axis of the graphs represents accumulated optical dispersion. The horizontal axis of the graphs represents the distance that the optical signal has traveled (the number of optical fiber spans over which the signal has traveled). $\Delta D_L$ refers to the residual optical dispersion that a signal should exhibit after each span for optimum performance.

Figure 2A:
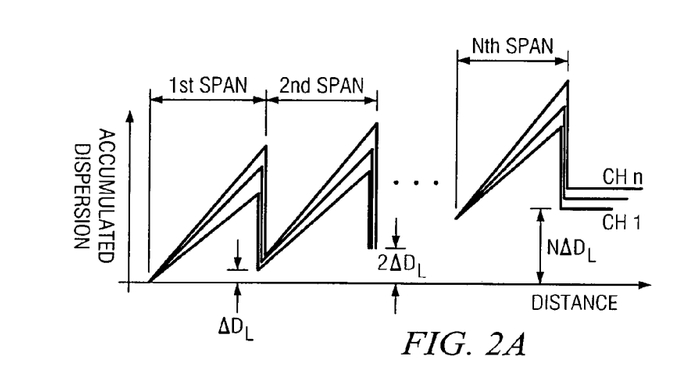
FIGS. 2A and 2B are graphs illustrating the difference in optimum optical dispersion compensation for the sets of channels of FIG. 1.

FIG. 2A illustrates an optical dispersion map for a signal comprising a set of ten GB/s NRZ channels that would optimize performance for that signal. As illustrated in FIG. 2A, the ten GB/s NRZ channels have optimum performance when they are undercompensated. In other words, performing optical dispersion compensation in the optical signal after each span so that the optical signal exhibits a positive $\Delta D_L$ per span leads to optimal performance for the ten GB/s NRZ channels.

Figure 2B:
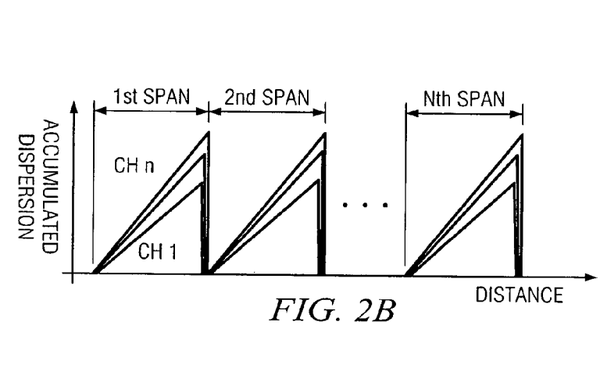

As illustrated in FIG. 2B, a signal comprising a set of forty GB/s DPSK or DQPSK channels has optimum performance when the channels undergo 100% compensation. In other words, performing optical dispersion compensation on the optical signal after each span so that the optical signal exhibits a zero $\Delta D_L$ per span leads to optimal performance for the forty GB/s DPSK or DQPSK channels.

As illustrated in FIGS. 2A and 2B, complete optical dispersion compensation is different for channels using an NRZ modulation format than for channels using a DPSK/DQPSK modulation format. It should be noted again that "complete" optical dispersion compensation refers to the optimum or near-optimum optical dispersion compensation for a particular modulation technique. In existing networks, optical dispersion compensation devices perform complete optical dispersion compensation on signals using one modulation format, such as the NRZ format. If upgraded transmitters using a different modulation format, such as the DPSK/DQPSK format, are incorporated into the network alongside existing NRZ transmitters, the existing optical dispersion compensation devices will not perform complete optical dispersion compensation for the upgraded optical signals.

For example, existing optical dispersion compensation devices in a previously all-NRZ network will perform complete optical dispersion compensation for NRZ channels and incomplete optical dispersion compensation for DPSK/DQPSK channels. Running the signal through another optical dispersion compensation device would then produce complete optical dispersion compensation for the DPSK/DQPSK channels (if residual optical dispersion is close to zero) but would overcompensate for optical dispersion in the already-compensated NRZ signal. Embodiments of the present invention, discussed below, address the challenge of providing complete optical dispersion compensation in signals carrying channels using different modulation formats.

Referring back to the example embodiment in FIG. 1, the WDM signal generated by node 12a includes sets of channels using different modulation formats. In particular, the WDM signal comprises a set of channels communicating information at ten GB/s using NRZ modulation and a set of channels communicating information at forty GB/s using DPSK or DQPSK modulation; however, the sets of disparate channels may communicate information at any suitable bit rate and/or using any suitable modulation technique. For example, one or more of the channels may communicate information at a rate of ten, twenty, forty, eighty, over eighty GB/s, or any other suitable bit rate. One or more of the channels may additionally communicate information using a modulation technique such as return-to-zero (RZ), carrier suppressed return-to-zero (CS-RZ), NRZ, DPSK, DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

After the multi-channel signal is transmitted from terminal node 12a, the signal travels over optical fibers 28 to OADMs 31. The optical fibers 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10.

OADMs 31 include an amplifier 26 and associated optical dispersion compensating module 30 (DCM), as well as an add/drop module 32 (ADM). As discussed above, amplifiers 26 may be used to amplify the WDM signal as it travels through the optical network 10. DCMs 30 include any dispersion compensating fiber (DCF) or other dispersion compensating device operable to perform optical dispersion compensation on a signal or set of channels comprising a signal that use one modulation technique. For a signal comprising channels using different modulation techniques such as NRZ and DPSK/DQPSK, DCMs 30 may be operable to perform complete optical dispersion compensation on one set of channels using one modulation technique and incomplete optical dispersion compensation on another set of channels using another modulation technique.

As described above and referring to FIGS. 2A and 2B, DCMs 30 produce different results for differently-modulated channels because the NRZ- and DPSK/DQPSK-modulated channels perform optimally with different levels of residual optical dispersion. NRZ-modulated channels perform optimally with some residual dispersion, and DPSK/DQPSK-modulated channels perform optimally with no residual dispersion. In the example embodiment of FIG. 1, the DCMs 30 are operable to perform complete dispersion compensation on the ten GB/s NRZ channels and incomplete dispersion compensation on the forty GB/s DPSK/DQPSK channels. Although the optical network 10 shows the DCMs 30 coupled to respective amplifiers 26, the DCMs 30 may also be positioned separately from the amplifiers 26.

ADMs 32 may include any device or combination of devices operable to add and/or drop optical signals from fibers 28. ADMs 32 may also include any device or combination of devices operable to complete optical dispersion compensation in one or more sets of channels in an optical signal for which dispersion compensation was not completed by the associated DCM 30. The components that comprise various embodiments of ADMs 32 are described more fully below in conjunction with FIGS. 3, 4, and 5. Again, it should be noted that as used herein, "complete" optical dispersion compensation refers to the optimum or near-optimum optical dispersion compensation for a particular modulation technique.

After a signal passes through OADM 31, the signal may travel along fibers 28 directly to terminal node 12b, or the signal may be passed through one or more additional OADMs 31 (such as OADM 31b, for example) before reaching terminal node 12b. Terminal node 12b is operable to receive signals transmitted over optical network 10. Terminal node 12b includes an amplifier 26 and an associated DCM 30, a demultiplexer 20, and receivers 22 and 24. As described above, amplifier 26 may be used to amplify the WDM signal as it travels through the optical network 10, and DCM 30 may perform complete optical dispersion compensation on a set of channels comprising a signal that use one modulation technique. Again, although the optical network 10 shows DCM 30 coupled to a respective amplifier 26, the DCM 30 may also be positioned separately from amplifier 26.

Demultiplexer 20 includes any demultiplexer or other device operable to separate the disparate channels multiplexed using WDM, DWDM, or other suitable multi-channel multiplexing technique. Demultiplexer 20 is operable to receive an optical signal carrying a plurality of multiplexed channels, demultiplex the disparate channels in the optical signal, and pass the disparate channels to different receivers 22 and 24.

Receivers 22 and 24 include any receiver or other suitable device operable to receive an optical signal. Each receiver 22 or 24 is operable to receive a channel of an optical signal carrying encoded information and demodulate the information into an electrical signal. These channels received by receivers 22 or 24 may include the channels transmitted by transmitters 14 and 16 and/or channels added by ADMs 32.

As noted above, DCM 30 completely compensates only a set of channels comprising a signal that use one modulation technique. In example optical network 10, DCM 30 at terminal node 12b completes optical dispersion compensation only for the set of ten GB/s NRZ channels. Though not illustrated in optical network 10 in FIG. 1, the forty GB/s DPSK/DQPSK channels may also be compensated at terminal node 12b, using, for example, tunable dispersion compensators at receivers 24. Thus, both ten GB/s NRZ and forty GB/s DPSK/DQPSK signals receive complete optical dispersion compensation.

In operation, transmitters 14 and 16 of terminal node 12a transmit information at different bit rates and/or using different modulation techniques over different channels. The multiplexer 18 combines these different channels into an optical signal and communicates the signal over optical fiber 28. An amplifier 26 receives the optical signal, amplifies the signal, and passes the signal over optical fiber 28. Optical fiber 28 transports the signal to an OADM 31a. Amplifier 26 of OADM 31a receives the signal, amplifies the signal, and passes the signal to the DCM 30 of OADM 31a. Again, amplifier 26 of OADM 31a may be positioned separately from, either before or after, the DCM 30.

The DCM 30 of OADM 31a receives the signal and performs optical dispersion compensation on the signal. As described above, the DCM 30 cannot compensate both sets of differently-modulated channels optimally. In the example embodiment of FIG. 1, the DCM 30 performs complete dispersion compensation on the ten GB/s NRZ channels and incomplete dispersion compensation on the forty GB/s DPSK or DQPSK channels, and forwards the optical signal. Complete dispersion compensation for the NRZ channels correlates to the results shown in FIG. 2A for optimum dispersion compensation in the ten GB/s NRZ channels.

After the DCM 30 performs optical dispersion compensation on the signal and forwards the signal, the ADM 32 of OADM 31a receives the signal. After receiving the optical signal, the ADM 32 may drop channels from the optical signal and/or add channels to the optical signal. The ADM 32 also completes optical dispersion compensation on the channels for which dispersion was not completed by the DCM 30. In the example embodiment of FIG. 1, the ADM 32 completes optical dispersion compensation on the forty GB/s DPSK/DQPSK channels. Complete optical dispersion in the DPSK/DQPSK channels correlates to the results shown in FIG. 2B for optimum dispersion compensation in the forty GB/s DPSK/DQPSK channels. The ADM 32 then forwards a signal comprising one or more of the compensated NRZ or DPSK/DQPSK channels and one or more of the added channels (if channels are added by the ADM 32). There may be one or more OADMs 31 in example optical network 10.

After the signal passes through the one or more OADMs 31 (such as, for example, OADMs 31a and 31b), DCM 30 of terminal node 12b receives the forwarded signal and performs optical dispersion compensation on the signal. As described above, the DCM 30 cannot compensate both sets of differently-modulated channels optimally. In the example embodiment of FIG. 1, the DCM 30 performs complete dispersion compensation on the ten GB/s NRZ channels and incomplete dispersion compensation on the forty GB/s DPSK or DQPSK channels, and forwards the optical signal.

The demultiplexer 20 of terminal node 12b receives the signal, demultiplexes the signal into the signal's constituent channels, and passes the signal's constituent channels. Each channel is received by an associated receiver 22 or 24 of terminal node 12b and forwarded. Though not shown in FIG. 1, complete optical dispersion compensation may be performed on the set of demultiplexed channels that were not compensated by the DCM 30 at terminal node 12b. In the example embodiment of FIG. 1, these channels would be the incompletely compensated forty GB/s DPSK/DQPSK signals received at terminal node 12b.

As noted above, although the optical network 10 is shown as a point-to-point optical network with terminal nodes, the optical network 10 may also be configured as a ring optical network, a mesh optical network, or any other suitable optical network or combination of optical networks.

It should be noted that although particular components have been shown, modifications, additions, or omissions may be made to the optical network 10 without departing from the scope of the invention. The components of the optical network 10 may be integrated or separated according to particular needs. Moreover, the operations of the optical network 10 may be performed by more, fewer, or other components.

Figure 3:
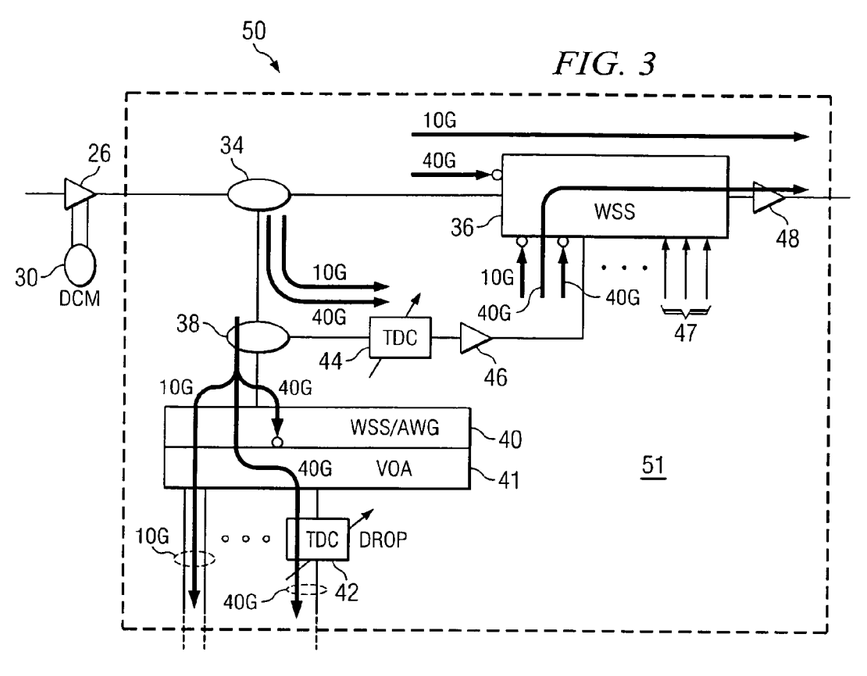
FIG. 3 is a block diagram illustrating an optical add/drop multiplexer of the network of FIG. 1 that compensates for optical dispersion according to a particular embodiment of the present invention.

FIG. 3 is a block diagram illustrating an OADM 50 (which is one example of an OADM 31 of the network of FIG. 1) that compensates for optical dispersion according to a particular embodiment of the present invention. OADM 50 includes an amplifier 26 and an associated DCM 30, as illustrated in FIG. 1, along with an ADM 51 (which is one example of an ADM 32 illustrated in FIG. 1). Because the amplifier 26 and DCM 30 are described above in the description of the example embodiment of FIG. 1, these devices will not be described again. It should be noted again however that although amplifier 26 and DCM 30 are shown combined in FIG. 3, amplifier 26 and DCM 30 may also be separated.

ADM 51 is operable to receive an optical signal on the optical network 10, and, as described below, complete optical dispersion compensation in the set of channels for which dispersion was not completed by the associated DCM 30. In the example embodiment of FIG. 3, ADM 51 is operable to perform complete optical dispersion compensation in the forty GB/s DPSK/DQPSK channels. ADM 51 may include couplers 34 and 38, a wavelength selective switch (WSS) 36, a demultiplexer 40 with an associated variable optical attenuator (VOA) 41, tunable dispersion compensators (TDCs) 42 and 44, and amplifiers 46 and 48.

Couplers 34 and 38 may comprise an optical fiber coupler or other optical component operable to split an optical signal. Couplers 34 and 38 are operable to split an optical signal into two copies of the optical signal.

The WSS 36 may comprise any WSS or other device operable to receive multiple optical signals, demultiplex each signal into the signal's constituent channels, terminate zero, one or more channels received, multiplex the remaining channels and any added channels, and pass the multiplexed signal along the optical network 10.

The demultiplexer 40 may comprise any device operable to receive an optical signal and demultiplex the channels in the optical signal. For example, the demultiplexer 40 may be a WSS or an arrayed waveguide grating (AWG). However, any other suitable demultiplexer 40 may be used. The VOA 41 may comprise a VOA or any other device operable to balance power levels of output channels.

TDCs 42 and 44 may comprise any device operable to compensate for optical dispersion in each of a plurality of sets of channels using different modulation techniques. Although tunable devices are described, any other suitable compensation devices may be used.

Amplifiers 46 and 48 may be the same as amplifiers 26 described above in conjunction with FIG. 1 and thus will not be described again. Although two amplifiers are shown as an example, any suitable number of amplifiers may be used (including no amplifiers, if suitable).

In operation, the amplifier 26 receives an optical signal communicated on optical network 10, amplifies the optical signal, and forwards the optical signal to the DCM 30. As described above, the optical signal includes one or more ten GB/s NRZ channels and one or more forty GB/s DPSK/DQPSK channels. The DCM 30 receives the optical signal and performs optical dispersion compensation on the signal. In the example embodiment, as described above, DCM 30 performs complete dispersion compensation on the set of ten GB/s NRZ channels and incomplete dispersion compensation on the set of forty GB/s DPSK or DQPSK channels. Complete dispersion compensation for the NRZ channels correlates to the results shown in FIG. 2A for optimum dispersion compensation in the ten GB/s NRZ channels. As illustrated in FIGS. 2A and 2B, complete optical dispersion compensation for the NRZ channels means that the DPSK/DQPSK channels receive incomplete optical dispersion compensation.

In ADM 51, the first coupler 34 receives the optical signal from DCM 30, splits the optical signal into two copies, passes the first copy to WSS 36, and drops the second copy to coupler 38. The WSS 36 receives the first copy and terminates the forty GB/s DPSK or DQPSK channels (since they are not completely compensated), allowing the completely compensated ten GB/s NRZ channels to pass (unless traffic is being added in a particular NRZ channel), as described below.

The second coupler 38 receives the second copy, splits the second copy into two additional copies (a third copy and a fourth copy), drops the third copy to demultiplexer 40, and passes the fourth copy to TDC 44. The demultiplexer 40 receives the third copy and separates the channels of the third copy. The VOA 41 may then attenuate the levels of the separated channels to balance the separated channels as needed. Each channel may then be dropped to an associated receiver for communication to one or more client devices of ADM 51 (or to other suitable destinations), or may be terminated. The ten GB/s NRZ channels may be dropped directly to an associated receiver(s) of ADM 51 since the NRZ channels are fully compensated. However, any forty GB/s DPSK/DQPSK channels that are to be dropped must be further compensated. Therefore, a separate TDC 42 receives each forty GB/s DPSK/DQPSK channel that is dropped, completes optical dispersion compensation for each forty GB/s DPSK/DQPSK channel (as illustrated in FIG. 2B), and forwards the forty GB/s channel to an associated receiver.

The TDC 44 receives the fourth copy, completes dispersion compensation on the forty GB/s DPSK or DQPSK channels (as illustrated in FIG. 2B), and forwards the fourth copy to the amplifier 46. It should be noted that since the ten GB/s NRZ channels were already completely compensated before entering TDC 44, the ten GB/s NRZ channels output from TDC 44 are overcompensated. The amplifier 46 receives the fourth copy, amplifies the fourth copy, and forwards the fourth copy to the WSS 36. The WSS 36 receives the fourth copy, terminates the ten GB/s NRZ channels (since they are overcompensated), and combines the completely compensated forty GB/s DPSK or DQPSK channels with the completely compensated ten GB/s NRZ channels from the first copy. However, the WSS 36 may terminate particular forty GB/s DPSK/DQPSK channels if the ADM 51 is a destination node for the forty GB/s channel and/or if traffic is being added at ADM 51 in that channel (as indicated by arrows 47). The WSS 36 may also add traffic originating from ADM 51 in one or more of the ten GB/s NRZ channels (in which case these channels in the first copy are terminated). The WSS 36 then forwards the new optical signal comprising the compensated ten GB/s NRZ channels and the compensated forty GB/s DPSK/DQPSK channels and any added channels to amplifier 48. The amplifier 48 receives the new optical signal, amplifies the new optical signal, and passes the new optical signal along optical network 10.

Although the OADM 50 described compensates for dispersion in sets of forty GB/s DPSK/DQPSK and ten GB/s NRZ channels, the two sets of channels may have different bit rates or modulation formats than those described, including the ones listed above in discussing FIG. 1. In addition, the OADM 50 may completely compensate for optical dispersion in more than two sets of channels that use different modulation techniques (by creating, for example, additional copies of the optical signal at coupler 38 to be compensated differently).

Figure 4:
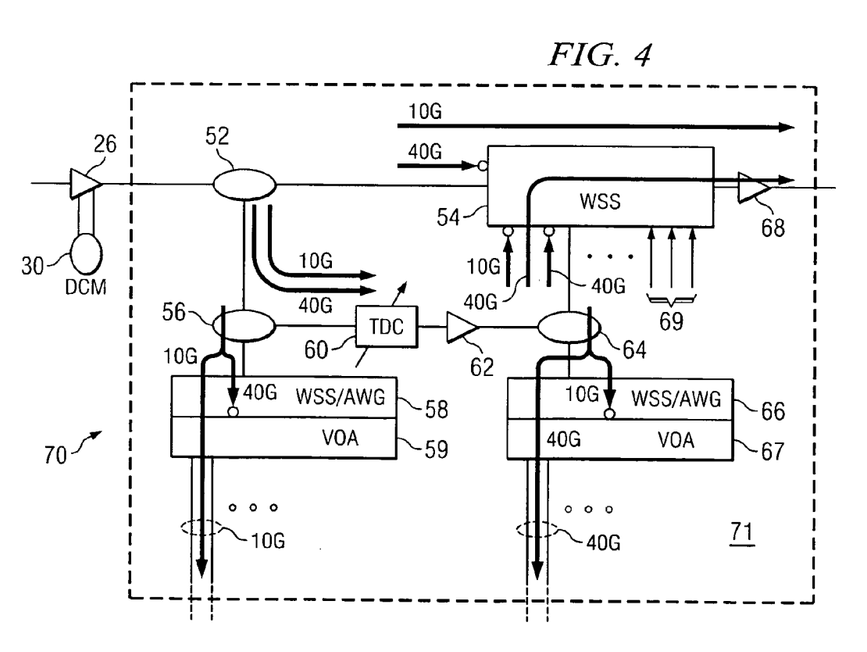
FIG. 4 is a block diagram illustrating another optical add/drop multiplexer of the network of FIG. 1 that compensates for optical dispersion according to another embodiment of the present invention.

FIG. 4 is a block diagram illustrating an OADM 70 (which is one example of OADM 31 of the network of FIG. 1) that compensates for optical dispersion according to another embodiment of the present invention. OADM 70 includes an amplifier 26 and an associated DCM 30, as illustrated in FIG. 1, along with an ADM 71 (which is one example of an ADM 32 illustrated in FIG. 1). Because the amplifier 26 and DCM 30 are described above in the description of the example embodiment of FIG. 1, these devices will not be described again. It should be noted again however that although amplifier 26 and DCM 30 are shown combined in FIG. 4, amplifier 26 and DCM 30 may also be separated.

ADM 71 is operable to receive an optical signal on the optical network 10, and, as described below, complete optical dispersion compensation in the set of channels for which dispersion was not completed by the associated DCM 30. In the example embodiment of FIG. 4, ADM 71 is operable to perform complete optical dispersion compensation in the forty GB/s DPSK/DQPSK channels. ADM 71 may include couplers 52, 56, and 64; a WSS 54; demultiplexers 58 and 66 with associated VOAs 59 and 67, respectively; a TDC 60; and amplifiers 62 and 68.

Couplers 52, 56, and 64 may comprise an optical fiber coupler or other optical component operable to split an optical signal. Couplers 52, 56, and 64 are operable to split an optical signal into two copies of the optical signal.

The WSS 54 may comprise any WSS or other device operable to receive multiple optical signals, demultiplex each signal into the signal's constituent channels, terminate zero, one or more channels received, multiplex the remaining channels and any added channels; and pass the multiplexed signal along the optical network 10.

Demultiplexers 58 and 66 may comprise any device operable to receive an optical signal and demultiplex the channels in the optical signal. For example, demultiplexers 58 and 66 may be a WSS or an AWG. However, any other suitable demultiplexers 58 and 66 may be used. VOAs 59 and 67 may comprise a VOA or any other device operable to balance power levels of output channels.

The TDC 60 may comprise any device operable to compensate for optical dispersion in each of a plurality of sets of channels using different modulation techniques. Although a tunable device is described, any other suitable compensation device may be used.

Amplifiers 62 and 68 may be the same as amplifiers 26 described above in conjunction with FIG. 1 and thus will not be described again. Although two amplifiers are shown as an example, any suitable number of amplifiers may be used (including no amplifiers, if suitable).

In operation, the amplifier 26 receives an optical signal communicated on optical network 10, amplifies the optical signal, and forwards the optical signal to the DCM 30. As described above, the optical signal includes one or more ten GB/s NRZ channels and one or more forty GB/s DPSK/DQPSK channels. The DCM 30 receives the optical signal and performs optical dispersion compensation on the signal. In the example embodiment, as described above, DCM 30 performs complete dispersion compensation on the set of ten GB/s NRZ channels and incomplete dispersion compensation on the set of forty GB/s DPSK or DQPSK channels. Complete dispersion compensation for the NRZ channels correlates to the results shown in FIG. 2A for optimum dispersion compensation in the ten GB/s NRZ channels. As illustrated in FIGS. 2A and 2B, complete optical dispersion compensation for the NRZ channels means that the DPSK/DQPSK channels receive incomplete optical dispersion compensation.

In ADM 71, the first coupler 52 receives the optical signal from DCM 30, splits the optical signal into two copies, passes the first copy to WSS 54, and drops the second copy to coupler 56. The WSS 54 receives the first copy and terminates the forty GB/s DPSK or DQPSK channels (since they are not completely compensated), allowing the completely compensated ten GB/s NRZ channels to pass (unless traffic is being added in a particular NRZ channel), as described below.

The second coupler 56 receives the second copy, splits the second copy into two additional copies (a third copy and a fourth copy), drops the third copy to demultiplexer 58, and passes the fourth copy to TDC 60. The demultiplexer 58 receives the third copy and separates the channels of the third copy. The VOA 59 may then attenuate the levels of the separated channels to balance the separated channels as needed. Since the ten GB/s NRZ channels are completely compensated, each ten GB/s NRZ channel may then be dropped directly to an associated receiver for communication to one or more client devices of ADM 71 (or to other suitable destinations), or may be terminated. The forty GB/s DPSK/DQPSK channels are all terminated (since they are not completely compensated).

The TDC 60 receives the fourth copy, completes dispersion compensation on the forty GB/s DPSK or DQPSK channels (as illustrated in FIG. 2B), and forwards the fourth copy to the amplifier 62. It should be noted that since the ten GB/s NRZ channels were already completely compensated before entering TDC 60, the ten GB/s NRZ channels output from TDC 60 are overcompensated. The amplifier 62 receives the fourth copy, amplifies the fourth copy, and forwards the fourth copy to the third coupler 64. The third coupler 64 receives the fourth copy, splits the fourth copy into two additional copies (a fifth copy and a sixth copy), drops the fifth copy to demultiplexer 66, and passes the sixth copy to WSS 54.

The demultiplexer 66 receives the fifth copy and separates the channels of the fifth copy. The VOA 67 may then attenuate the levels of the separated channels to balance the separated channels as needed. Since the forty GB/s DPSK/DQPSK channels are completely compensated, each forty GB/s DPSK/DQPSK channel may then be dropped directly to an associated receiver for communication to one or more client devices of ADM 71 (or to other suitable destinations), or may be terminated. The ten GB/s NRZ channels are all terminated (since they are overcompensated).

The WSS 54 receives the sixth copy, terminates the ten GB/s NRZ channels (since they are overcompensated), and combines the completely compensated forty GB/s DPSK or DQPSK channels with the completely compensated ten GB/s NRZ channels from the first copy. However, the WSS 54 may terminate particular forty GB/s DPSK/DQPSK channels if ADM 71 is a destination node for the forty GB/s channel and/or if traffic is being added at ADM 71 in that channel (as indicated by arrows 69). The WSS 54 may also add traffic originating from ADM 71 in one or more of the ten GB/s NRZ channels (in which case these channels in the first copy are terminated). The WSS 54 then forwards the new optical signal comprising the compensated ten GB/s NRZ channels and the compensated forty GB/s DPSK/DQPSK channels and any added channels to amplifier 68. The amplifier 68 receives the new optical signal, amplifies the new optical signal, and passes the new optical signal along optical network 10.

Although OADM 70 described compensates for dispersion in sets of forty GB/s DPSK/DQPSK and ten GB/s NRZ channels, the two sets of channels may have different bit rates or modulation formats than those described, including the ones listed above in discussing FIG. 1. In addition, OADM 70 may completely compensate for optical dispersion in more than two sets of channels that use different modulation techniques (by creating, for example, additional copies of the optical signal at coupler 56 to be compensated differently).

Figure 5A:
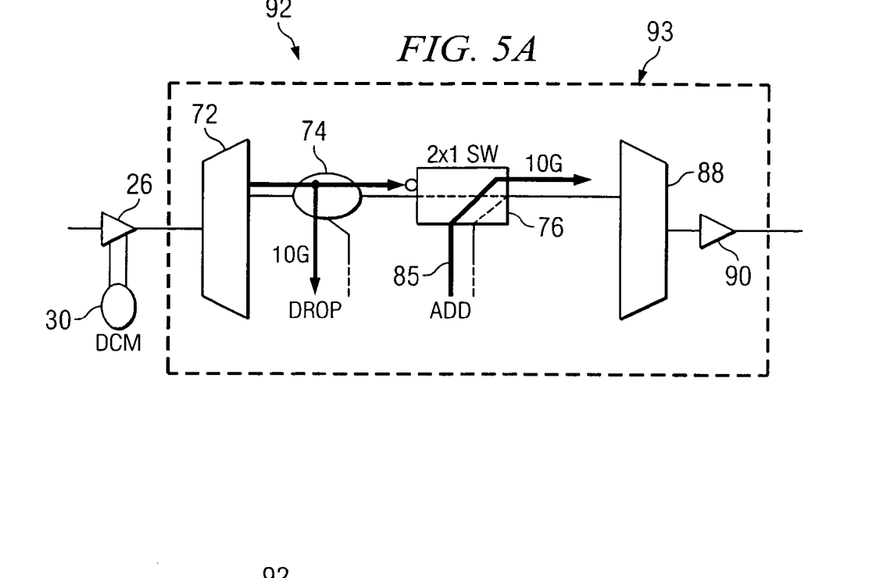
FIGS. 5A and 5B are block diagrams illustrating yet another optical add/drop multiplexer of the network of FIG. 1 that compensates for optical dispersion according to yet another embodiment of the present invention.
Figure 5B:
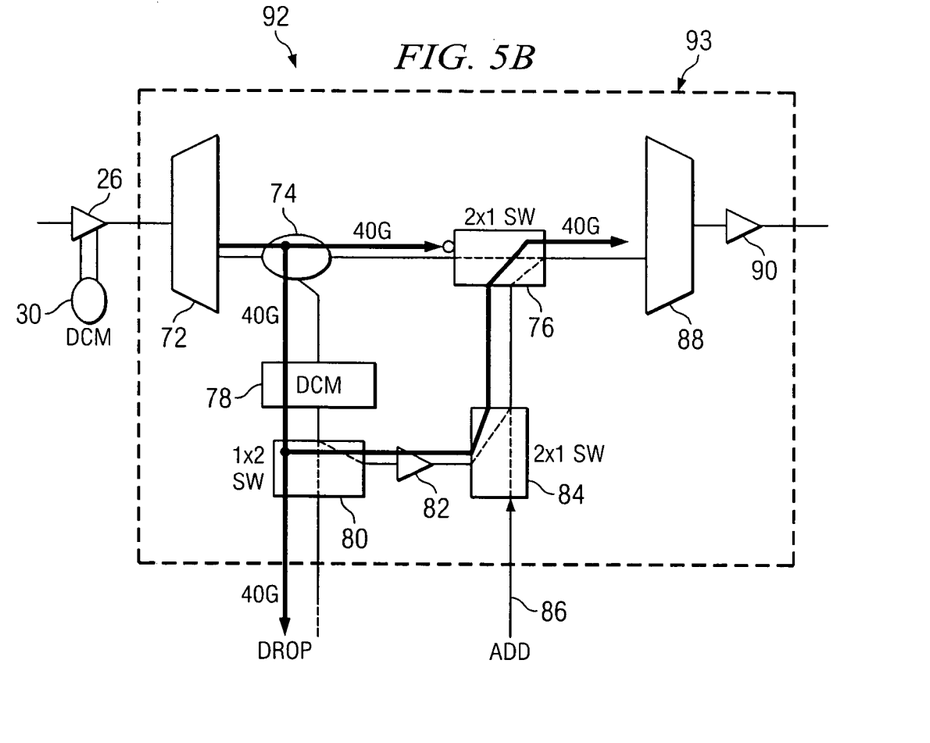

FIGS. 5A and 5B are block diagrams illustrating an OADM 92 (which is one example of an OADM 31 of the network of FIG. 1) that compensates for optical dispersion according to yet another embodiment of the present invention. As described in more detail below, FIG. 5A illustrates the path through OADM 92 of a signal in a particular channel that is modulated using one modulation technique, and FIG. 5B illustrates the path through the same OADM 92 of a signal in a particular channel that is modulated using another modulation technique. In the example network 10, FIG. 5A illustrates the path of a ten GB/s NRZ channel, and FIG. 5B illustrates the path of a forty GB/s DPSK/DQPSK channel. It should be noted that although only one of each signal is shown (one ten GB/s NRZ signal and one forty GB/s DPSK/DQPSK signal), there may be multiple ten GB/s NRZ and forty GB/s DPSK/DQPSK signals passing through the same OADM 92, each signal having a set of components as shown.

OADM 92 of FIGS. 5A and 5B includes an amplifier 26 and an associated DCM 30, as illustrated in FIG. 1, along with an ADM 93 (which is one example of an ADM 32 illustrated in FIG. 1). Because the amplifier 26 and DCM 30 are described above in the description of the example embodiment of FIG. 1, these devices will not be described again. It should be noted again however that although amplifier 26 and DCM 30 are shown combined in FIGS. 5A and 5B, amplifier 26 and DCM 30 may also be separated.

ADM 93 of FIGS. 5A and 5B is operable to receive an optical signal on the optical network 10, and, as described below, complete optical dispersion compensation in the set of channels for which dispersion was not completed by the associated DCM 30. In the example embodiment of FIGS. 5A and 5B, ADM 93 is operable to perform complete optical dispersion compensation in the forty GB/s DPSK/DQPSK channels. ADM 93 may include a demultiplexer 72; a multiplexer 88; an amplifier 90; one or more sets of components including a coupler 74 and a two-by-one switch 76; and one or more sets of components including a dispersion compensation module (DCM) 78, a one-by-two switch 80, an amplifier 82, and a two-by-one switch 84. It should be noted that the coupler 74 and the two-by-one switch 76 already may be provided for every channel demultiplexed in ADM 93, as illustrated in FIGS. 5A and 5B. The DCM 78, the one-by-two switch 80, the amplifier 82, and the two-by-one switch 84 may then be added for the forty GB/s DPSK/DQPSK channels to complete optical dispersion compensation in those channels, as illustrated in FIG. 5B.

The demultiplexer 72 may comprise any device operable to receive an optical signal and separate the optical signal's constituent channels. For example, the demultiplexer 72 may be a WSS or an AWG. However, any other suitable demultiplexer 72 may be used.

The coupler 74 may comprise an optical fiber coupler or other optical component operable to split an optical signal. Coupler 74 is operable to split an optical signal into two copies of the optical signal.

Two-by-one switches 76 and 84 may comprise a two-by-one switch or any other device operable to receive an optical signal from one of two sources and forward the received optical signal to one destination. If the two-by-one switch 76 or 84 is open, the two-by-one switch 76 or 84 is operable to pass an optical signal from a first source and to terminate an optical signal from a second source. If the two-by-one switch 76 or 84 is closed, the two-by-one switch 76 or 84 is operable to pass an optical signal from the second source and to terminate an optical signal from the first source.

The one-by-two switch 80 may comprise a one-by-two switch or any other device operable to receive an optical signal and forward the received optical signal to one of two destinations. If the one-by-two switch 80 is open, the one-by-two switch 80 is operable to forward the received optical signal to a first destination and does not forward the received optical signal to a second destination. If the one-by-two switch 80 is closed, the one-by-two switch 80 is operable to forward the received optical signal to the second destination and does not forward the received optical signal to the first destination.

The DCM 78 may include a DCF or other device operable to complete optical dispersion compensation on a channel using one modulation technique.

Amplifiers 82 and 90 may be the same as amplifiers 26 described above in conjunction with FIG. 1 and thus will not be described again. Although two amplifiers are shown as an example, any suitable number of amplifiers may be used (including no amplifiers, if suitable).

The multiplexer 88 may comprise any multiplexer or any other device operable to combine disparate channels into optical signals. For example, the multiplexer 88 may be an AWG. However, any other suitable multiplexer may be used.

In operation, the amplifier 26 receives an optical signal communicated on optical network 10, amplifies the optical signal, and forwards the optical signal to the DCM 30. As described above, the optical signal includes one or more ten GB/s NRZ channels and one or more forty GB/s DPSK/DQPSK channels. The DCM 30 receives the optical signal and performs optical dispersion compensation on the signal. In the example embodiment, as described above, DCM 30 performs complete dispersion compensation on the set of ten GB/s NRZ channels and incomplete dispersion compensation on the set of forty GB/s DPSK or DQPSK channels. Complete dispersion compensation for the NRZ channels correlates to the results shown in FIG. 2A for optimum dispersion compensation in the ten GB/s NRZ channels. As illustrated in FIGS. 2A and 2B, complete optical dispersion compensation for the NRZ channels means that the DPSK/DQPSK channels receive incomplete optical dispersion compensation.

In ADM 93, the demultiplexer 72 receives the optical signal and demultiplexes the channels in the optical signal. Each channel then goes to its associated coupler 74. With respect to each of the ten GB/s NRZ channels, because optical dispersion compensation has already been completed for each of these channels, the set of optical components including the DCM 78, the one-by-two switch 80, the amplifier 82, and the two-by-one switch 84 need not be provided for these channels, as illustrated in FIG. 5A. After each ten GB/s NRZ channel goes to its associated coupler 74, the associated coupler 74 receives the signal in the channel and splits the signal into two copies. The first copy may either be dropped to an associated receiver for communication to one or more client devices of ADM 93 (or to other suitable destinations) or be terminated. Termination of the first copy would occur, for example, if the drop lead of the coupler 74 is terminated. The second copy may be forwarded to the two-by-one switch 76. Two-by-one switch 76 may either terminate the second copy or pass the second copy to multiplexer 88. For example, two-by-one switch 76 may terminate the second copy if an add signal 85 for the channel is received from a transmitter at the two-by-one switch 76. Otherwise, switch 76 may pass the second copy.

With respect to each of the forty GB/s DPSK/DQPSK channels, as illustrated in FIG. 5B, the associated coupler 74 receives the signal in the channel and splits the signal into two copies, passes the first copy to the two-by-one switch 76, and drops the second copy to the DCM 78. The two-by-one switch 76 terminates the first copy (since compensation is not complete).

The DCM 78 receives the second copy, completes dispersion compensation on the second copy, and forwards the second copy to one-by-two switch 80. The one-by-two switch 80 receives the second copy. Since the forty GB/s DPSK/DQPSK channel is completely compensated, the forty GB/s DPSK/DQPSK channel may then be dropped directly to an associated receiver for communication to one or more client devices of ADM 93 (or to other suitable destinations). The one-by-two switch 80 may alternatively pass the second copy to amplifier 82 if the signal in the channel is not destined for this particular ADM 93.

If the one-by-two switch 80 passes the second copy, the amplifier 82 receives the second copy, amplifies the second copy, and forwards the second copy to switch 84. The two-by-one switch 84 receives the second copy and passes the second copy to switch 76. Alternatively, if the signal in the channel was dropped by switch 80, switch 84 may receive an add signal 86 in that channel and pass this signal 86 to switch 76. The two-by-one switch 76 receives and passes either the second copy or the added signal 86 to multiplexer 88. The multiplexer 88 receives the signal (either the second copy or the added signal 86) and multiplexes the signal with the signals in one or more completely compensated ten GB/s NRZ channels from the original signal (or one or more added ten GB/s NRZ signals 85) and/or one or more other similarly compensated forty GB/s DPSK/DQPSK signals. The multiplexer 88 then passes the multiplexed signal to amplifier 90. The amplifier 90 receives the multiplexed signal, amplifies the signal, and passes the signal along the optical network 10.

Although the OADM 92 described compensates for dispersion in one of the set of forty GB/s DPSK/DQPSK, the optical dispersion compensation method for the one DPSK/DQPSK channel can be used to compensate for optical dispersion in one or more of the other demultiplexed forty GB/s DPSK or DQPSK channels as well. One or more ten GB/s NRZ channels may also travel across, be added and/or be dropped in ADM 93, as described above.

Although the OADM 92 described compensates for dispersion in sets of forty GB/s DPSK/DQPSK and ten GB/s NRZ channels, the two sets of channels may have different bit rates or modulation formats than those described, including the ones listed above in discussing FIG. 1. In addition, the OADM 92 may completely compensate for optical dispersion in more than two sets of channels that use different modulation techniques.

Modifications, additions, or omissions may be made to the OADMs described without departing from the scope of the invention. The components of the OADMs described may be integrated or separated according to particular needs. Moreover, the operations of the OADMs may be performed by more, fewer, or other components.

Figure 6:
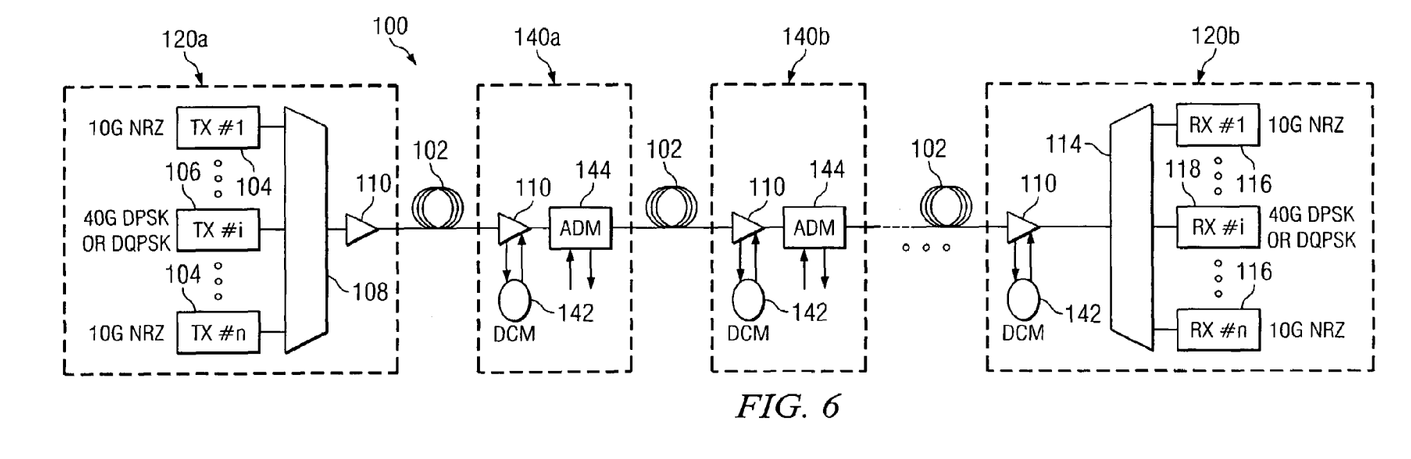
FIG. 6 is a block diagram illustrating another embodiment of an optical network comprising channels using at least two different modulation formats.

FIG. 6 is a block diagram illustrating another embodiment of an optical network comprising channels using at least two different modulation formats. Like example network 10 of FIG. 1, example optical network 100 of FIG. 6 addresses the challenge discussed above of optimally compensating for optical dispersion in a signal comprising channels using different modulation techniques. Again, this challenge has arisen due to the desire of optical network operators to upgrade their networks incrementally to increase network capacity. Specifically, these operators have sought to increase network capacity through the cost-efficient strategy of integrating upgraded transmitters with existing transmitters. This strategy has created a need for solutions to the challenge of optimally compensating for optical dispersion in signals comprising differently-modulated channels, the difference in modulation due to the different types of transmitters modulating signals differently.

Example network 100 of FIG. 6 offers an alternative technique to that in example network 10 for addressing the challenge of optimally compensating for dispersion in a signal comprising differently-modulated channels. Instead of compensating each set of differently-modulated channels in a signal differently as in example network 10, example network 100 of FIG. 6 applies the same dispersion compensation to all channels in the optical signal.

Like example network 10, example optical network 100 is operable to carry a signal comprising a plurality of channels using at least two different modulation formats. The optical network 100 also includes one or more optical fibers 102 operable to transport one or more optical signals communicated by components of the optical network 100. The components of optical network 100, coupled together by the optical fibers 102, include terminal nodes 120a and 120b and one or more optical add/drop multiplexers (OADM) 140. Terminal node 120a and fibers 102 may be the same as terminal node 12a and fibers 28, respectively, described above in conjunction with FIG. 1 and thus will not be described again. Although the optical network 100 is shown as a point-to-point optical network with terminal nodes, the optical network 100 may also be configured as a ring optical network, a mesh optical network, or any other suitable optical network or combination of optical networks. The optical network 100 may be used in a short-haul metropolitan network, a long-haul inter-city network, or any other suitable network or combination of networks.

In example network 100, where all channels in a signal receive the same dispersion compensation as the signal travels across the network, the amount of dispersion compensation applied to each channel may be chosen to reduce inter-channel effects in the signal such as cross-phase modulation (XPM). In network 100, the compensation required to reduce inter-channel effects may depend on the sets of differently-modulated signals being carried by a signal. For example and without limitation, in a signal carrying two sets of channels, ten GB/s NRZ channels and forty GB/s DPSK/DQPSK channels, respectively, over single mode fiber (SMF), experiments have shown that performing uniform undercompensation on these signals or compensating these signals so that all channels exhibit zero dispersion may not reduce inter-channel effects optimally or near-optimally. Instead, applying uniform overcompensation (between approximately 110% and 115% overcompensation in some tests) to all channels has reduced inter-channel effects most. It should be noted, however, that signals carrying different sets of differently-modulated channels may require different dispersion compensation to reduce inter-channel effects optimally or near-optimally.

In light of these findings, particular embodiments of example network 100 perform uniform dispersion overcompensation on signals comprising ten GB/s NRZ and forty GB/s DPSK/DQPSK channels as these signals travel across the network. In particular embodiments, a signal comprising ten GB/s NRZ and forty GB/s DPSK/DQPSK channels may receive, for example, between approximately 110% and 115% overcompensation. It should be noted that channels in these signals may receive additional compensation if and when they are dropped at an OADM 140 or are received at terminal node 120b to provide optimal or near-optimal dispersion compensation for the particular data rate and/or modulation format of the channel as described below.

OADMs 140 of example network 100 include an amplifier 110 and associated optical dispersion compensating fibers 142 (DCM), as well as an add/drop module 144 (ADM). Amplifier 110 may be the same as amplifiers 26 described above in conjunction with FIG. 1 and thus will not be described again. DCMs 142 include any DCF, TDC, variable dispersion compensator (VDC), or other device operable to overcompensate for optical dispersion. The signal may be overcompensated any suitable amount to enhance the performance of the signal. This amount may include, for example and without limitation, between approximately 110% and 115% overcompensation at each DCM 142. Although the example network 100 illustrates the DCMs 142 coupled to respective amplifiers 110, the DCMs 142 may also be positioned separately from the amplifiers 110.

ADMs 144 include any device or combination of devices operable to add and/or drop optical signals from fibers 102. ADMs 144 may also include any device or combination of devices operable to complete optical dispersion compensation on the signals in example network 100. ADM 144 devices may include, for example, those devices illustrated in FIGS. 3-5 above. The devices of FIGS. 3-5 would need to be modified, however, to complete optical dispersion compensation on the overcompensated forty GB/s DPSK/DQPSK channels (as opposed to completing optical dispersion compensation on undercompensated forty GB/s DPSK/DQPSK channels, as in FIGS. 3-5).

Terminal node 120b of example network 100 is operable to receive signals transmitted over optical network 100 and compensate those signals for optical dispersion. Except for replacing DCM 30 with DCM 142, terminal node 120b may be the same as terminal node 12b described above in conjunction with FIG. 1, and thus will not be described again. In addition, because DCM 142 is described above in the description of OADMs 140, DCM 142 will not be described again. However, it should be noted again that although example network 100 illustrates DCM 142 coupled to a respective amplifier 110, DCM 142 may also be positioned separately from amplifier 110. It should also be noted that although not illustrated in example optical network 100, in particular embodiments, the forty GB/s DPSK/DQPSK signals may be compensated at terminal node 120b, using, for example, TDCs or other dispersion compensating devices before those demultiplexed forty GB/s DPSK/DQPSK signals are received at receivers 118.

Figure 7:
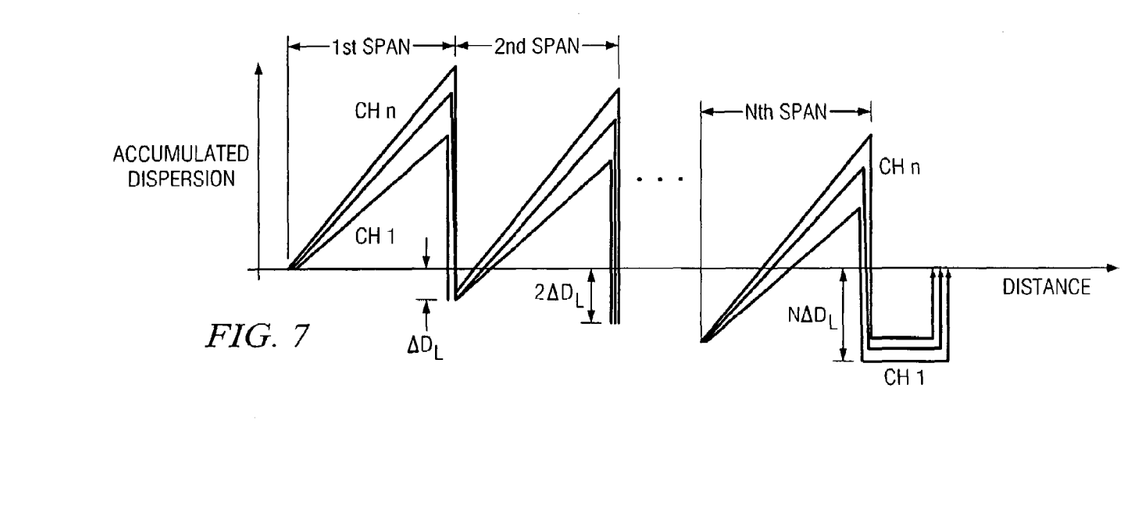
FIG. 7 is a graph illustrating optical dispersion compensation for signals in the optical network of FIG. 6.

FIG. 7 is a graph illustrating optical dispersion compensation for signals in the optical network of FIG. 6. Specifically, the graph illustrates the optical dispersion overcompensation performed by DCMs 142 of optical network 100. The vertical axis represents accumulated optical dispersion. The horizontal axis represents the distance that the optical signal has traveled (the number of optical fiber spans over which the signal has traveled). $\Delta D_L$ refers to the residual optical dispersion that a signal in an example embodiment exhibits after each span for optimum (or near-optimum) performance.

FIG. 7 shows how DCMs 142 perform optical dispersion overcompensation on a signal in example network 100 after each span. In particular embodiments, each DCM 142 overcompensates for dispersion in an amount greater than the dispersion accumulated over the span of fiber 102 by $\Delta D_L$. Thus, after the first span over which the signal has traveled, DCM 142 will compensate the signal such that accumulated dispersion is equal to $\Delta D_L$. Over N spans, accumulated dispersion is equal to $N(\Delta D_L)$. In particular embodiments, as described above, before being received by receivers 118 of terminal node 120b, the forty GB/s DPSK/DQPSK signals may be compensated by additional dispersion compensation devices such as, for example, additional TDCs (not illustrated in FIG. 6). FIG. 7 illustrates how, in particular embodiments, additional dispersion compensation is applied by these devices on the forty GB/s DPSK/DQPSK signals such that these signal comprise zero accumulated optical dispersion. The ten GB/s NRZ signals may not need any additional compensation before being received by receivers 116.

Referring again to FIG. 6, in operation, transmitters 104 and 106 of terminal node 120a transmit information at different bit rates and/or using different modulation techniques over different channels. The multiplexer 108 combines these different channels into an optical signal and communicates the signal over optical fiber 102. An amplifier 110 receives the optical signal, amplifies the signal, and passes the signal over optical fiber 102. Optical fiber 102 transports the signal to an OADM 140a. Amplifier 110 of OADM 140a amplifies the signal and passes the signal to the DCM 142. Again, the amplifier may be positioned separately from, either before or after, the DCM 142 on the network 100.

DCM 142 of OADM 140a receives the signal and performs optical dispersion overcompensation on the signal. The signal may be overcompensated any suitable amount to enhance the performance of the signal. This amount may include, for example and without limitation, between approximately 110% and 115% overcompensation at each DCM 142.

After DCM 142 overcompensates the signal such that the signal exhibits $\Delta D_L$ overcompensation, DCM 142 forwards the signal to ADM 144 of OADM 140a. ADM 144 may drop channels from the optical signal and/or add channels to the signal. Before dropping any of the optical channels, ADM 144 may complete optical dispersion compensation on the channels, such as by using, for example, the methods illustrated in FIGS. 3-5 above. As described above, modifications and additions may need to be made to the methods of FIGS. 3-5 to provide complete optical dispersion compensation on overcompensated channels (such as, for example, on the overcompensated forty GB/s DPSK/DQPSK channels) that are being dropped at an OADM 140. The ADM 144 then forwards the overcompensated signal over fiber 102.

After the signal passes through the one or more OADMs (such as OADMs 140a and 140b), DCM 142 of terminal node 120b receives the forwarded signal and performs optical dispersion overcompensation on the signal. DCM 142 then forwards the optical signal to demultiplexer 114. Demultiplexer 114 receives the signal, demultiplexes the signal into the signal's constituent channels, and passes the signal's constituent channels. Each channel is received by an associated receiver 116 or 118 of terminal node 120b and forwarded. Though not shown in FIG. 6, in particular embodiments, complete optical dispersion compensation (approximately 100% compensation) may be performed on the forty GB/s DPSK/DQPSK channels at terminal node 120b, as described above.

Modifications, additions, or omissions may be made to the network 100 described without departing from the scope of the invention. The components of the network 100 described may be integrated or separated according to particular needs. Moreover, the operations of the network 100 may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for dispersion compensation of an optical signal, comprising:

receiving an optical signal comprising a plurality of channels, wherein the information being communicated in a first set of one or more of the channels is modulated using a first modulation technique and wherein the information being communicated in a second set of one or more of the channels is modulated using a second modulation technique;

compensating for optical dispersion in the optical signal such that dispersion compensation for the first set of channels is complete for the first modulation technique and such that dispersion compensation for the second set of channels is incomplete for the second modulation technique;

splitting the optical signal into at least a first copy of the optical signal and a second copy of the optical signal;

terminating the second set of channels in the first copy;

performing additional dispersion compensation on the second copy such that dispersion compensation for the second set of channels is complete for the second modulation technique; and terminating the first set of channels in the second copy.

2. The method of claim 1, wherein:
the information being communicated in the first set of channels is communicated at 10 GB/s; and
the information being communicated in the second set of channels is communicated at 40 GB/s.

3. The method of claim 1, further comprising combining the channels in the first and second copies of the optical signal that are not terminated to form a compensated optical signal.

4. The method of claim 1, further comprising:
before performing dispersion compensation on the second copy, splitting the second copy into a third copy and a fourth copy, wherein the additional dispersion compensation is performed on the fourth copy;
demultiplexing the channels of the third copy; and
dropping the information in one or more of the channels of the third copy to one or more client devices.

5. The method of claim 4, further comprising performing additional dispersion compensation on any of the channels being dropped to the client devices that are in the second set of channels.

6. The method of claim 1, further comprising:
before performing dispersion compensation on the second copy, splitting the second copy into a third copy and a fourth copy, wherein the additional dispersion compensation is performed on the fourth copy;
demultiplexing the channels of the third copy;
dropping the information in one or more of the first set of channels of the third copy to one or more client devices; and
after performing dispersion compensation on the fourth copy such that dispersion compensation for the second set of channels is complete, dropping the information in one or more of the second set of channels of the fourth copy to one or more client devices.

7. An optical dispersion compensation system operable to receive an optical signal comprising a plurality of channels, wherein the information being communicated in a first set of one or more of the channels is modulated using a first modulation technique and wherein the information being communicated in a second set of one or more of the channels is modulated using a second modulation technique, the system comprising:
a first dispersion compensation device operable to compensate for optical dispersion in the optical signal such that dispersion compensation for the first set of channels is complete for the first modulation technique and such that dispersion compensation for the second set of channels is incomplete for the second modulation technique;
a coupler operable to receive the optical signal from the first dispersion compensation device and to split the optical signal into at least a first copy of the optical signal and a second copy of the optical signal;
a second dispersion compensation device operable to receive the second copy and to perform additional dispersion compensation on the second copy such that dispersion compensation for the second set of channels is complete for the second modulation technique; and
a switch operable to terminate the second set of channels in the first copy of the optical signal and operable to terminate the first set of channels in the second copy of the optical signal.

8. The system of claim 7, wherein:
the information being communicated in the first set of channels is communicated at 10 GB/s; and
the information being communicated in the second set of channels is communicated at 40 GB/s.

9. The system of claim 7, wherein the switch is further operable to combine the remaining channels in the first and second copies to form a compensated optical signal.

10. The system of claim 7, further comprising:
a second coupler device operable to split the second copy of the optical signal into a third copy and a fourth copy, wherein the second dispersion compensation device is operable to perform additional dispersion compensation on the fourth copy; and
a demultiplexer operable to demultiplex the channels of the third copy and drop the information in one or more of the channels of the third copy to one or more client devices.

11. The system of claim 10, further comprising one or more third dispersion compensation devices each operable to perform additional dispersion compensation on a channel in the second set of channels that is being dropped to the client devices by the demultiplexer.

12. The system of claim 7, further comprising:
a second coupler device operable to split the second copy of the optical signal into a third copy and a fourth copy, wherein the second dispersion compensation device performs additional dispersion compensation on the fourth copy;
a demultiplexer operable to demultiplex the channels of the third copy and drop the information in one or more of the channels of the third copy to one or more client devices;
a second demultiplexer operable to drop the information in one or more of the second set of channels of the fourth copy to one or more client devices after the fourth copy has been compensated by the second dispersion compensation device.

* * * * *